Figure 1:
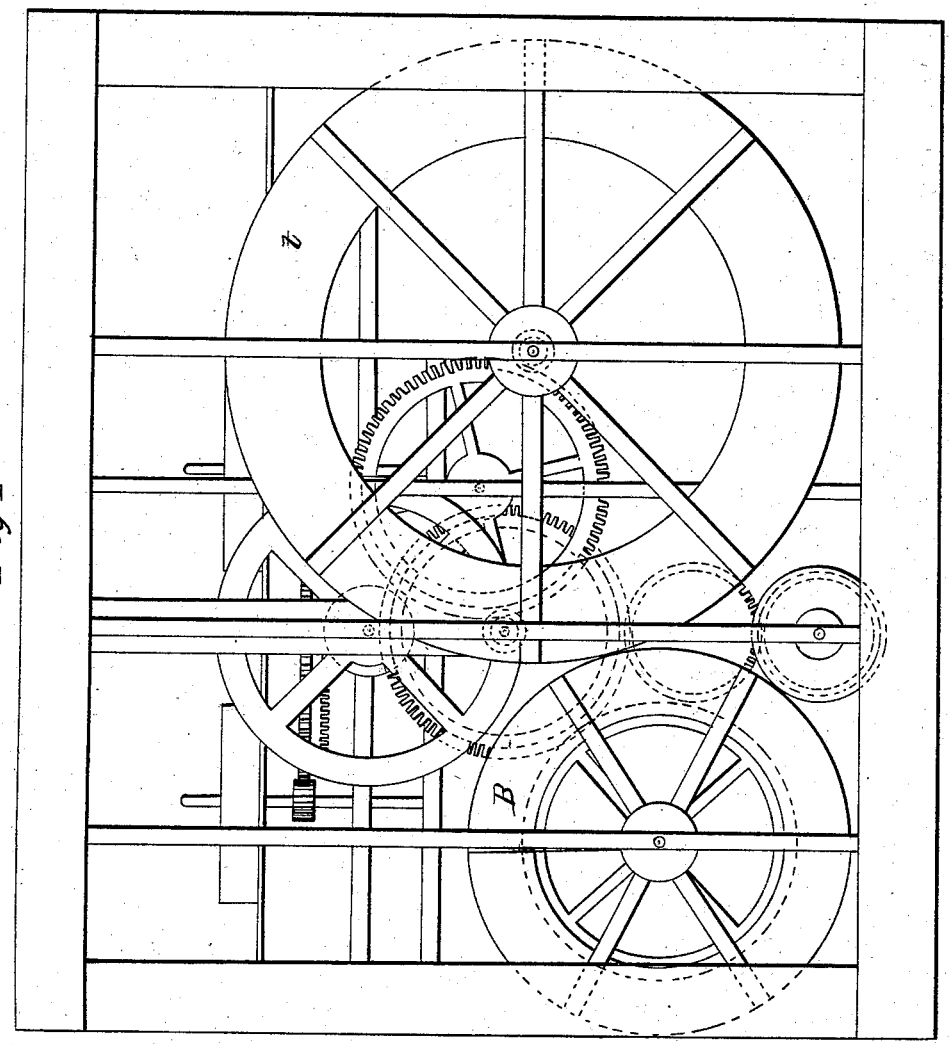

4 Sheets—Sheet 1.

L. Kratzer,
Water Wheel.

N°55,875.   Patented June 26, 1866.

Witnesses

Inventor:
Louis Kratzer

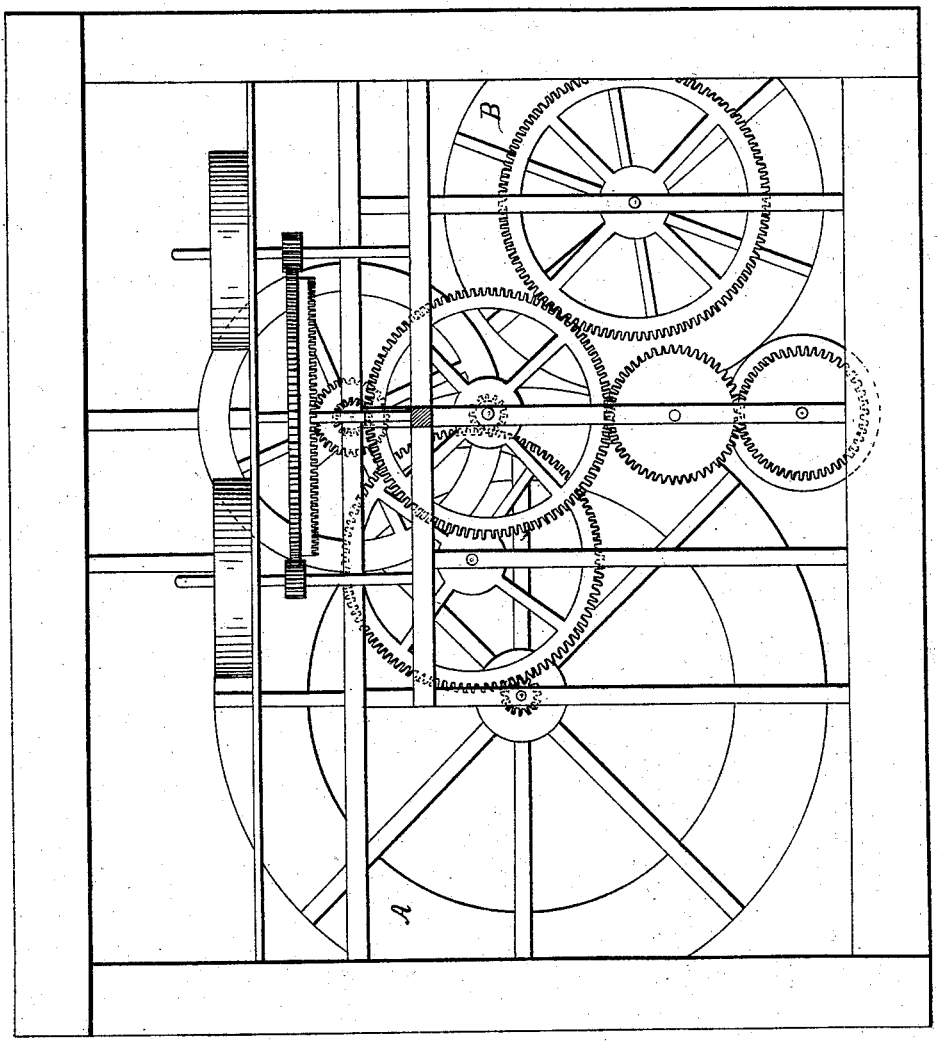

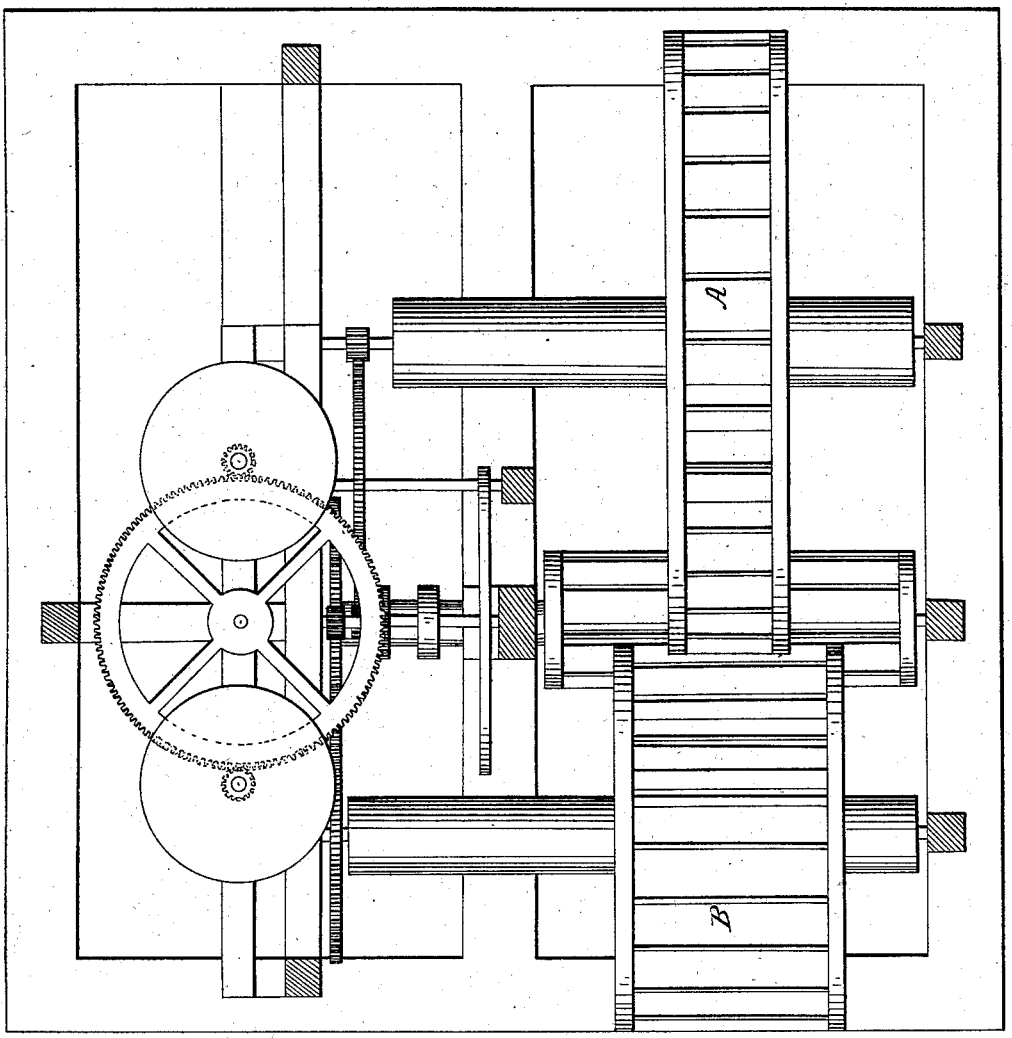

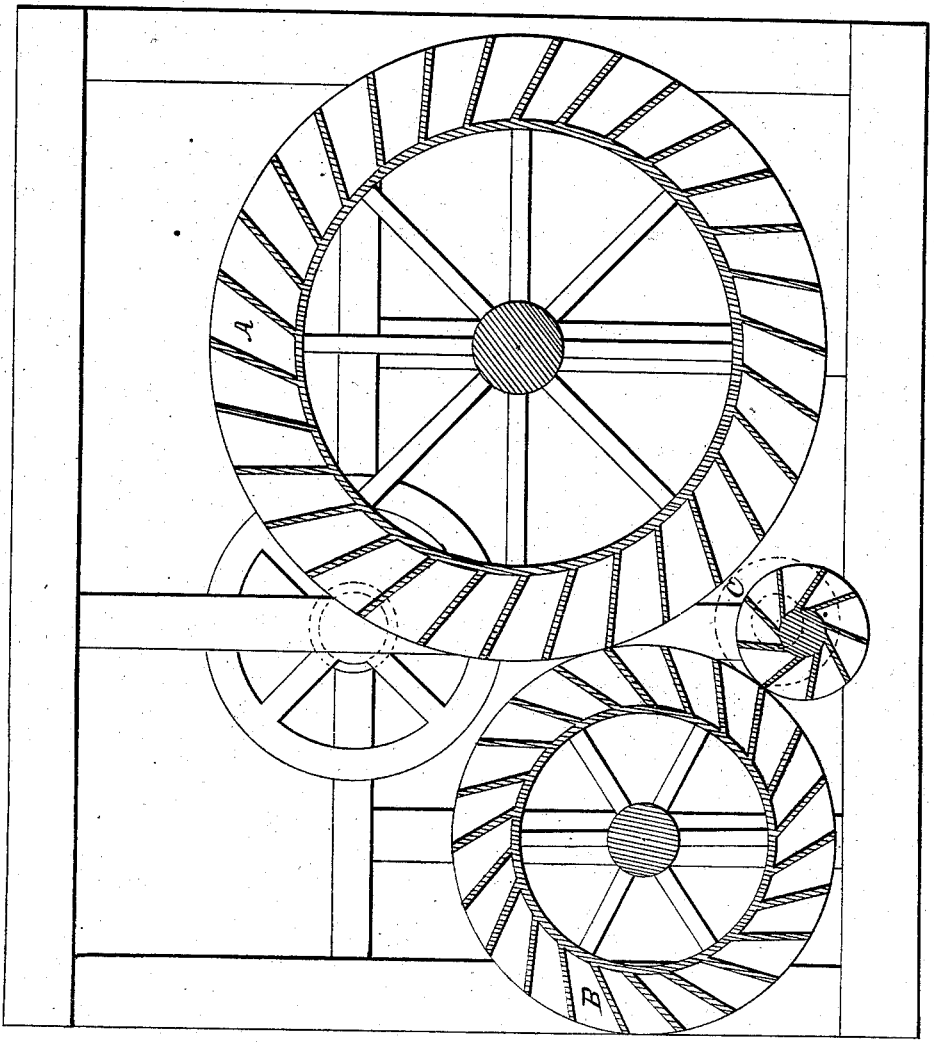

UNITED STATES PATENT OFFICE.

LOUIS KRATZER, OF BALTIMORE, MARYLAND.

IMPROVEMENT IN WATER-WHEELS.

Specification forming part of Letters Patent No. 55,875, dated June 26, 1866.

*To all whom it may concern:*

Be it known that I, LOUIS KRATZER, of Baltimore, in the county of Baltimore, in the State of Maryland, have invented a new and useful Arrangement and Combination of Overshot Water-Wheels, whereby water-power is made useful which otherwise is lost; and I do hereby declare that the following is a full and exact description thereof, reference being had to the accompanying drawings, and to the letters of reference marked thereon.

Figure 1 represents a front view of my arrangement of overshot water-wheels, showing the vertical position of the water-wheels. Fig. 2 is a rear view, exhibiting the gearing arrangement connected with the wheels. Fig. 3 is a top view, showing the horizontal position of the water-wheels, their dimensions, and connection with the gearing. Fig. 4 represents a vertical section through the water-wheels.

Similar letters of reference in each of the several figures indicate corresponding parts.

The nature of my invention consists in the combination of two, three, or more overshot water-wheels of proper dimensions, whereby the water flowing out of the buckets of one of the wheels, in consequence of the revolution of said wheel around its axis, is to be received within the buckets of another water-wheel of smaller diameter but the same capacity, causing it to revolve also, and so on, if practicable, as the case may be.

The nature of my invention further consists in connecting the shafts of the water-wheels by proper gearings, so that the working-power of the main wheel is increased by the revolutions of the additional wheel or wheels, caused by the water flowing from said main wheel hitherto discharged useless. But this does not exclude the application of the working power of each and every of the wheels separately, if wanted, inasmuch as the working power of each and every additional wheel represents a clear gain.

To enable others skilled in the art to make and use my invention, I will proceed to describe its construction and operation.

A represents the main water-wheel. The dimensions of this wheel may be determined by mathematical rules, according to the quantity and velocity of water on hand and applicable to over or middle shot water-wheels. The shape, curvature, and arrangement of the floats or buckets may be established in the same way. All this bears no relation to my improvement.

B represents a second wheel of smaller diameter, according to the number of revolutions wanted and the quantity of water to be received from the main wheel, the length of the buckets of this wheel to be increased so much as to allow them to hold all the water from the main wheel while revolving.

Suppose the outer diameter of the first or main wheel to be D, the number of buckets to be N, the number of revolutions of the wheel in a given time to be R, the length of the buckets in the direction of the shaft to be L, and the sectional area of the buckets of both wheels to be the same. Further, suppose the diameter of the second wheel to be one-half D, the number of buckets to be one-half N, the number of revolutions to be twice R, then the length of the buckets of this wheel had to be twice L, or nearly so; or, in other words, one bucket of the second wheel should have the capacity of two buckets of the first wheel, or nearly so. This proportion, however, may be changed according to requirements.

It is obvious that a third wheel, C, may be used to receive the overflowing water from the second wheel, bearing in dimensions the same relations to the second wheel as this wheel bears to the main wheel.

It also may be easily perceived that my improvement is applicable to every existing overshot water-wheel of sufficient diameter.

From this it will be seen that I cause the water flowing from an overshot water-wheel, and discharged hitherto unused, to act upon one, two, or more other water-wheels of smaller diameters, creating thereby an additional moving power, which power, of course, can be used from each wheel separately, or by transmission to the shaft of the main wheel with proper gearings, belting, or otherwise. In the latter case only care has to be taken that the gearing, belting, or other device is constructed in the proper manner relating to the number of revolutions due to each wheel.

We will suppose water at the moderate fall of ten feet, more or less, falling on the main wheel A, Fig. 4, and flowing from it into the buckets of the second wheel, B, and again flowing from B into the buckets of the third wheel, C, and forming a body of water directly behind the second wheel, B, which must pass off. In case that it was desirable, the second wheel, B, can be lowered so as to have the full advantage of the water in passing off by striking the float-boards or buckets at their lowest point and giving an additional impulse to the power already acting on the machinery. The object of this arrangement is to make use of the whole body of the water from its point of fall to its lowest level at the bottom, less the friction, thereby saving full one-half water or power, which is the same.

I disclaim any connection with the rejected application of Kammerer & Bassinger, rejected October 12, 1838, where they convey water by troughs into a forebay, from which it falls on a secondary or adjunctive wheel, and then is caught in a forebay for a second fall. This is meant to apply only to great falls and scant supply of water. Nor do I claim anything new in water-wheels; but What I do claim, and desire to secure by Letters Patent, is—

The arrangement of the wheels A, B, and C, so as to make use of the whole body of water in its descent to the level below, and its action in passing off, as herein set forth and described.

LOUIS KRATZER.

Witnesses:
J. F. CALLAN,
J. N. CALLAN.